A. M. Cheeseman,
Water-Closet Valve-Seat.
Nº 82,596.          Patented Sep. 29, 1868.
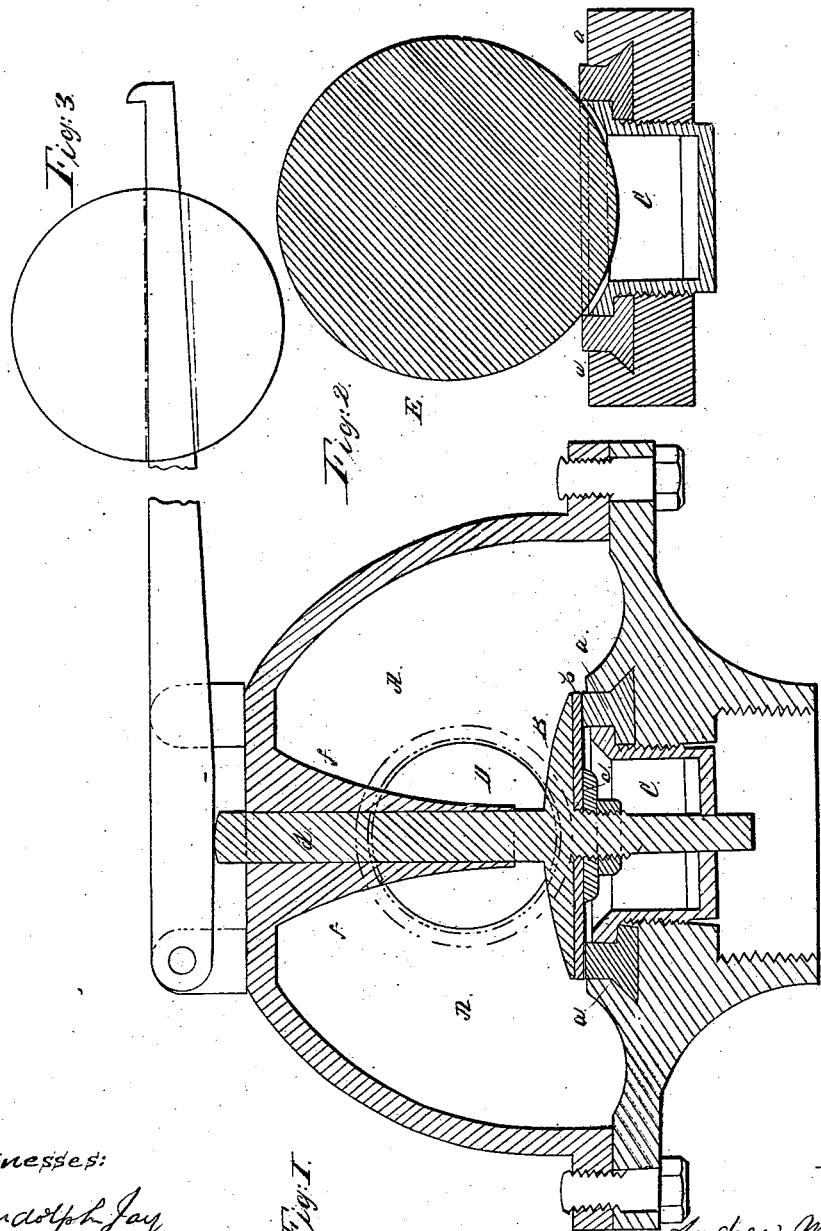
Witnesses:
Randolph Jay
George Painter
Inventor:
Andrew M. Cheeseman
by George E. Taylor atty.

United States Patent Office.

ANDREW M. CHEESEMAN, OF TRENTON, NEW JERSEY, ASSIGNOR TO HIMSELF AND JOHN WATSON, OF THE SAME PLACE.

*Letters Patent No. 82,596, dated September 29, 1868.*

IMPROVEMENT IN VALVE-SEATS.

*The Schedule referred to in these Letters Patent and making part of the same.*

TO ALL WHOM IT MAY CONCERN:

Be it known that I, ANDREW M. CHEESEMAN, of Trenton, in the county of Mercer, in the State of New Jersey, have invented certain new and useful Improvements in Valve-Seats; and I do hereby declare that the following is a full and exact description thereof, reference being had to the accompanying drawings, and to the letters of reference marked thereon.

Figure 1 represents a bisection, showing an inside view of a safety-valve with my improvement.

Figure 2 represents a rubber globe-valve resting upon rubber valve-seat $a\ a$.

Figure 3 represents the weight upon the lever.

My invention consists in a gum or rubber valve-seat, the lower part of the outer circumference fitting into a slot in the base of the valve-chamber, and secured to its proper place, by means of a metallic thimble inside of the rubber ring, the lower part of which thimble forms a guide to the bottom of the valve-stem. This seat may be combined with a rubber globe-valve, or any ordinary flat valve, composed partly of metal, and having the lower portion cased with rubber, and is particularly adapted to clay-presses for potteries. I make use of the rubber globe-valve for convenience of manufacture.

By this arrangement the wearing or cutting of the valve and seat is wholly prevented, as the clay and sand passing through the valve will not cut the rubber; whereas, a valve and valve-seat composed of porcelain, hardened steel, or any kind of metal, would be completely destroyed, and unfit for use in a short time. This rubber may be hardened to any degree suitable to the purpose for which it is intended.

To enable others skilled in the art to make use of my invention, I will proceed to describe the same.

Similar letters of reference, where they occur, denote like parts in the drawings.

A A represent the chamber of a safety-valve used for potteries, or for any other purpose where a certain pressure of water is required.

B represents the valve, which may be composed of any kind of metal, on the under side of which the gum or rubber $b$ closely fits, and rests firmly upon seat $a\ a$.

C is the opening or channel of the valve.

D, the escape-pipe of the chamber.

E, in fig. 2, represents a rubber globe-valve, resting upon rubber seat $a\ a$. The lower part of the rubber seat $a\ a$ is dove-tailed or recessed into the base of the chamber, and held firmly to its position by metallic thimble $c$.

$d$ represents the valve-stem, passing through the inverted cone $f\ f$. This cone keeps the valve B in its proper position.

Valves constructed in this manner are less expensive, less liable to get out of order, and more easily inserted than those composed wholly or in part of metal, and when soft clay, or water mixed with sand, is required to pass through, there is no wearing or cutting of the valve or seat. It is also applicable to all kinds of pumps where water not heated is used.

Having thus fully described my invention, what I claim as new, and desire to secure by Letters Patent, is—

The rubber valve-seat $a\ a$, secured to its position by metallic thimble $c$, substantially as shown and described.

ANDREW M. CHEESEMAN.

Witnesses:
RANDOLPH JAY,
CHAS. H. W. HUDNET.